United States Patent
Wu

(10) Patent No.: US 7,474,371 B2
(45) Date of Patent: Jan. 6, 2009

(54) METHOD OF IMPROVING THE FLATNESS OF A MICRODISPLAY SURFACE, LIQUID CRYSTAL ON SILICON (LCOS) DISPLAY PANEL AND METHOD OF MANUFACTURING THE SAME

(75) Inventor: Yi-Tyng Wu, Chia-I (TW)

(73) Assignee: United Microelectronics Corp., Hsin-Chu (TW)

(*) Notice: Subject to any disclaimer, the term of this patent is extended or adjusted under 35 U.S.C. 154(b) by 138 days.

(21) Appl. No.: 11/422,881

(22) Filed: Jun. 8, 2006

(65) Prior Publication Data

US 2007/0287211 A1    Dec. 13, 2007

(51) Int. Cl.
G02F 1/1333 (2006.01)
G02F 1/1335 (2006.01)

(52) U.S. Cl. .............. 349/122; 349/113; 349/5
(58) Field of Classification Search ............ 349/122, 349/113, 5
See application file for complete search history.

(56) References Cited

U.S. PATENT DOCUMENTS

| | | | |
|---|---|---|---|
| 4,432,610 A * | 2/1984 | Kobayashi et al. ......... 349/42 |
| 4,842,376 A * | 6/1989 | Braatz et al. .............. 349/28 |
| 6,521,475 B1 * | 2/2003 | Chen et al. ................ 438/34 |
| 6,569,699 B1 | 5/2003 | Lin et al. |
| 6,750,931 B2 | 6/2004 | Satake et al. |
| 6,825,909 B2 * | 11/2004 | Walker et al. ............ 349/158 |
| 6,828,595 B2 * | 12/2004 | Leng ........................ 257/98 |
| 7,324,171 B2 * | 1/2008 | Yasukawa .................. 349/44 |
| 2004/0097069 A1 | 5/2004 | Weng |

FOREIGN PATENT DOCUMENTS

| CN | 1635413 A | 7/2005 |
|---|---|---|
| CN | 1749814 A | 3/2006 |

OTHER PUBLICATIONS

Udayan Ganguly and J Peter Krusius, "Fabrication of Ultraplanar Aluminum Mirror Array by Novel Encapsulation CMP for Microoptics and MEMS Applications," Journal of The Electrochemical Society, 2004, pp. H1232-H238, 151(11) H232-H238(2004), The Electrochemical Society, Inc.

* cited by examiner

Primary Examiner—Mike Qi
(74) Attorney, Agent, or Firm—Winston Hsu

(57) ABSTRACT

A method of improving the flatness of a microdisplay surface. A reflective mirror layer and a raised layer are formed in order on a semiconductor substrate. The raised layer may comprise a buffer layer and a stop layer, and pixel electrode areas are defined therefrom and gaps are consequently formed among the pixel electrode areas. A dielectric layer is deposited on the pixel electrode areas and fills the gaps. A dielectric layer is partially removed such that the portion on the raised layer is completely removed and the portion filling the gaps are partially removed, thereby the remaining dielectric layer in the gaps has a height not lower than the top of the mirror layer. Thereafter, the raised layer is entirely or partially removed. A transparent conductive layer may be further combined onto the semiconductor substrate and a liquid crystal filling process is performed to form an LCoS display panel.

6 Claims, 11 Drawing Sheets

METHOD OF IMPROVING THE FLATNESS OF A MICRODISPLAY SURFACE, LIQUID CRYSTAL ON SILICON (LCOS) DISPLAY PANEL AND METHOD OF MANUFACTURING THE SAME

BACKGROUND OF THE INVENTION

1. Field of the Invention

The present invention provides a method of improving the flatness of a microdisplay surface and a liquid crystal on silicon (LCoS) display panel and method of manufacturing the same, and particularly an LCoS display panel with a good liquid crystal arrangement to improve optical performance.

2. Description of the Prior Art

LCoS (liquid crystal on silicon) display technology is the key to reflective LCD projectors and rear-projection televisions. The LCoS displays have the advantages of tiny size, high resolution, low power, low cost, etc. The difference between an LCoS display and an TFT-LCD is that the TFT-LCD uses a glass substrate or a quartz substrate as the back plane and is provided with a light source from the back side, while the LCoS display uses a silicon substrate as the back plane and is provided with a light source from the front side. As a result, the manufacturing of LCoS display panels can be integrated into standard semiconductor processes, and therefore has high stability and resolution.

However, in conventional LCoS display panels, the liquid crystal molecules in the liquid crystal layer tends to be toppled due to the recess between the mirror layer units. Referring to FIG. 1, a semiconductor substrate 12 comprises transistor devices (such as CMOS), metal interconnects, and metal plugs (not shown). A plurality of reflective mirror layer units 14 are formed on the surface of the semiconductor substrate 12. A dielectric layer 16 is filled in the gap between the mirror layer units 14. A transparent electrode 22 and a transparent substrate 24 are combined with the semiconductor substrate 12. Liquid crystal layer 26 is filled in the cell gap between the transparent electrode 22 and the semiconductor substrate 12. It is noted that a surface on which the liquid crystal layer 26 stands is comprised of a reflective mirror layer 14 and the dielectric layer 16. The surface has a recess at the position of the dielectric layer 16 due to the process. The liquid crystal molecules between the two pixel electrode areas are toppled due to the recess, resulting different arrangement angles for the liquid crystal molecules. Thus, the optical performance for the location between two pixels is affected.

Refer to FIG. 2 illustrating a conventional method of manufacturing LCoS display panels. In the conventional method, after reflective mirror layer units are defined, a dielectric layer 16a is deposited to fill the gaps between the mirror layer units. Due to processes, a recess 18 occurs on the surface of the dielectric layer corresponding to the gaps between the mirror layer units 14. Thereafter, referring to FIG. 3, a CMP process is generally used to remove part of the dielectric layer, and an etching process is continued to partially remove the resulting dielectric layer 16a, for not damaging the mirror layer units 14 (generally, aluminum). To ensure entire removal of the dielectric layer on the mirror layer units 14, an over etching is performed to leave the dielectric layer 16 only in the gaps; and the recess 20 is accordingly formed. The recess of the dielectric layer in the gaps is caused by process uniformity, similar to the inter layer dielectric (ILD) planarization in a general IC process. The recess 20 may have a depth, R, of more than 500 Å, and the arrangement of liquid crystal is affected.

U.S. Pat. No. 6,569,699 discloses a method of fabricating a LCD-on-silicon pixel device, in which, a pixel electrode is made by forming a first opaque conductive layer (comprising for example W, Ti, TiN, Cr, Ag, Co, or CoN) over the ILD, completely filing the via, planarizing the surface of the first opaque conductive layer having the recess caused by the plug, forming a second opaque conductive layer (comprising for example aluminum (Al), an aluminum copper alloy (AlCu), or aluminum silicon copper alloy (AlSiCu)) over the first opaque conductive layer, defining the pixel electrodes, and forming an optical interface layer as a reflective layer (for example, ON (i.e. an oxide layer over a nitride layer), ONON, ONONON, etc., up to five ON pairs) on the pixel electrodes. This patent intends to improve the light reflectivity of the pixel electrodes, while gaps exist between the pixel electrodes.

U.S. Pat. No. 6,750,931 discloses a reflective liquid crystal device, in which, four dielectric layers having different refractive indices are formed in order directly on the pixel electrode surface to improve light reflectivity. The problem of a recess on the surface on which liquid crystal molecules stand is not mentioned.

Udayan Ganguly and J Peter Krusius in "Fabrication of Ultraplanar Aluminum Mirror Array by Novel Encapsulation CMP for Microoptics and MEMS Applications," *Journal of The Electrochemical Society,* 151 (11) H232-H238 (2004), disclose a method of manufacturing pixel electrodes of a micro-display by encapsulation CMP. Unlike a general technique to forming a metal layer on the planar ILD to make pixel electrodes, in this method, a plurality of trenches are formed by etching the ILD, a metal layer is deposited conformally in the trenches, and a cap layer is deposited conformally over the metal layer, similar to encapsulate the metal layer in a plurality of trenches. Next, a part of the cap layer around the die is removed by reactive ion etching (RIE), and then the higher portion of the cap layer on the trench wall is removed by CMP. Finally, the part of the metal layer located on the trench wall higher than the bottom of the trench is removed by CMP, to achieve a planar surface. The surface comprises a cap layer and a small portion of the metal layer revealed from the cap layer.

Therefore, a LCoS display panel and the manufacturing method to solve the problem of the recess of the surface on which the liquid crystal molecules stand in order to improve optical performance of the display device are still needed.

SUMMARY OF THE INVENTION

An object of the present invention is to provide a method of improving the flatness of a microdisplay surface, an LCoS display panel and a method of manufacturing the LCoS display panel, such that the liquid crystal molecules therein are well arranged to have an improved optical performance.

The method of improving the flatness of a microdisplay surface according to the present invention comprises the steps as follows. First, a semiconductor substrate is provided. A reflective mirror layer is formed on the semiconductor substrate. A raised layer is formed on the mirror layer. Next, a plurality of pixel electrode areas is defined from the raised layer and the mirror layer; thereby a gap is formed between each two adjacent pixel electrode areas. A dielectric layer is deposited on the pixel electrode areas, completely fills the gaps. Thereafter, the dielectric layer is partially removed thereby the portion of the dielectric layer on the surface of the raised layer is completely removed and the portion of the dielectric layer filling the gaps is partially removed such that the remaining dielectric layer in the gaps has a height not lower than the top of the mirror layer. The raised layer is partially or entirely removed.

In another aspect, the method of manufacturing LCoS display panels according to the present invention comprises the steps as follows. First, a semiconductor substrate is provided. A reflective mirror layer is formed on the semiconductor substrate. A raised layer is formed on the mirror layer. Next, a plurality of pixel electrode areas is defined from the raised layer and the mirror layer; thereby a gap is formed between each two adjacent pixel electrode areas. A dielectric layer is deposited on the pixel electrode areas, completely fills the gaps. Thereafter, the dielectric layer is partially removed thereby the portion of the dielectric layer on the surface of the raised layer is completely removed and the portion of the dielectric layer filling the gaps is partially removed such that the remaining dielectric layer in the gaps has a height not lower than the top of the mirror layer. The raised layer is removed. A transparent conductive layer is combined onto the semiconductor substrate with the pixel electrode areas therebetween. Finally, a liquid crystal filling process is performed to fill the liquid crystal in a cell gap between the semiconductor substrate and the transparent conductive layer.

In still another aspect, the LCoS display panels according to the present invention comprises a semiconductor substrate; a plurality of reflective mirror layer units on the semiconductor substrate to serve as pixel electrodes and for light reflection, wherein a dielectric layer is filled between each two adjacent reflective mirror layer units with a height not lower than the top of the mirror layer units; a transparent conductive layer combined onto the semiconductor substrate with the mirror layer units therebetween; and a liquid crystal layer disposed between the semiconductor substrate and the transparent conductive layer.

In the method of improving the flatness of a microdisplay surface, the LCoS display panels and the method of manufacturing the same according to the present invention, since the height of the dielectric layer filling the gaps among the pixel electrodes is equal to or slightly higher than the height of the pixel electrodes, the surface such formed has not recesses. Accordingly, the arrangement of the liquid crystal molecules is not affected and has a good light performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
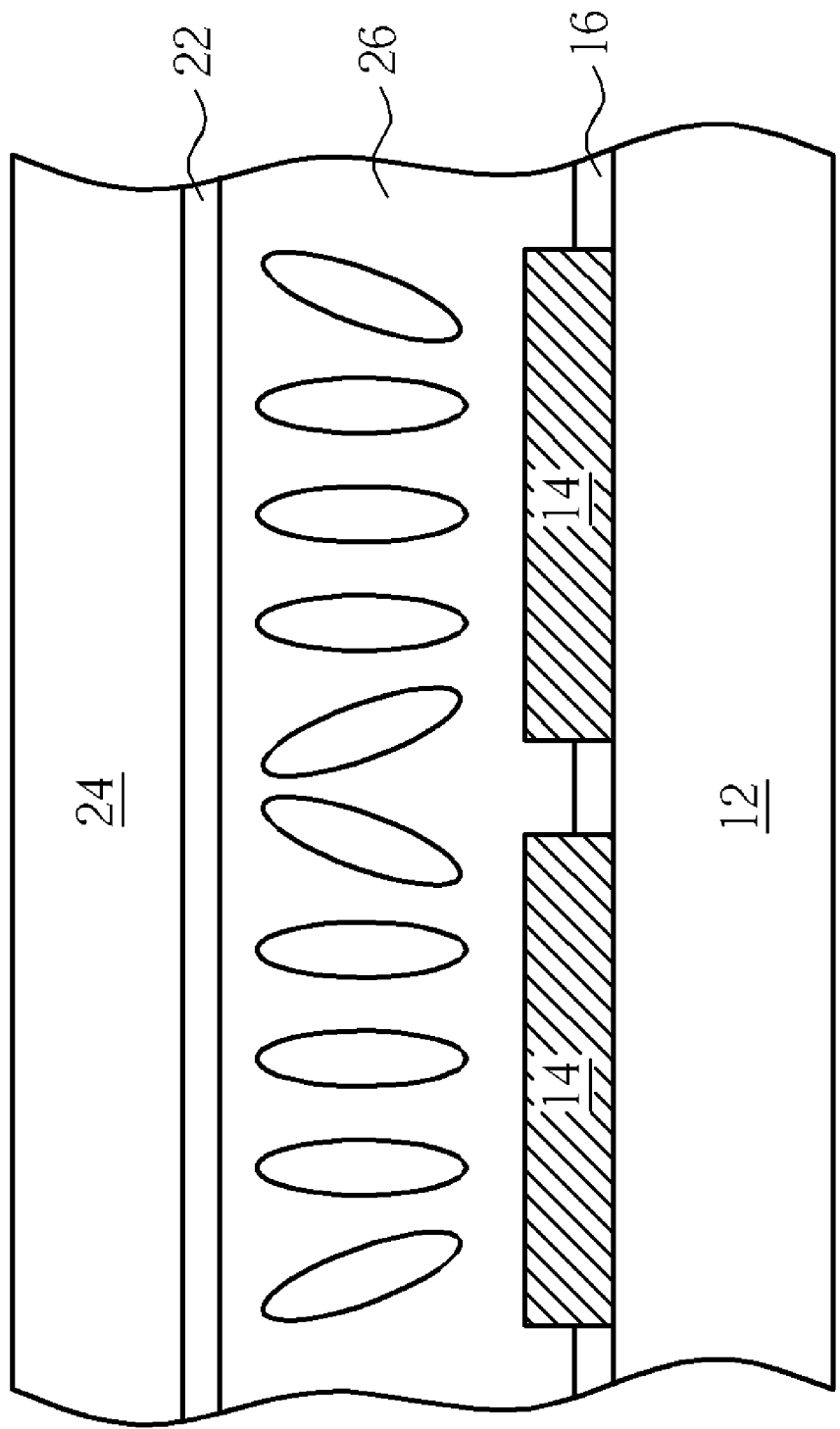
FIG. 1 is a schematically cross-sectional diagram showing a conventional LCoS display panel.
Figure 2:
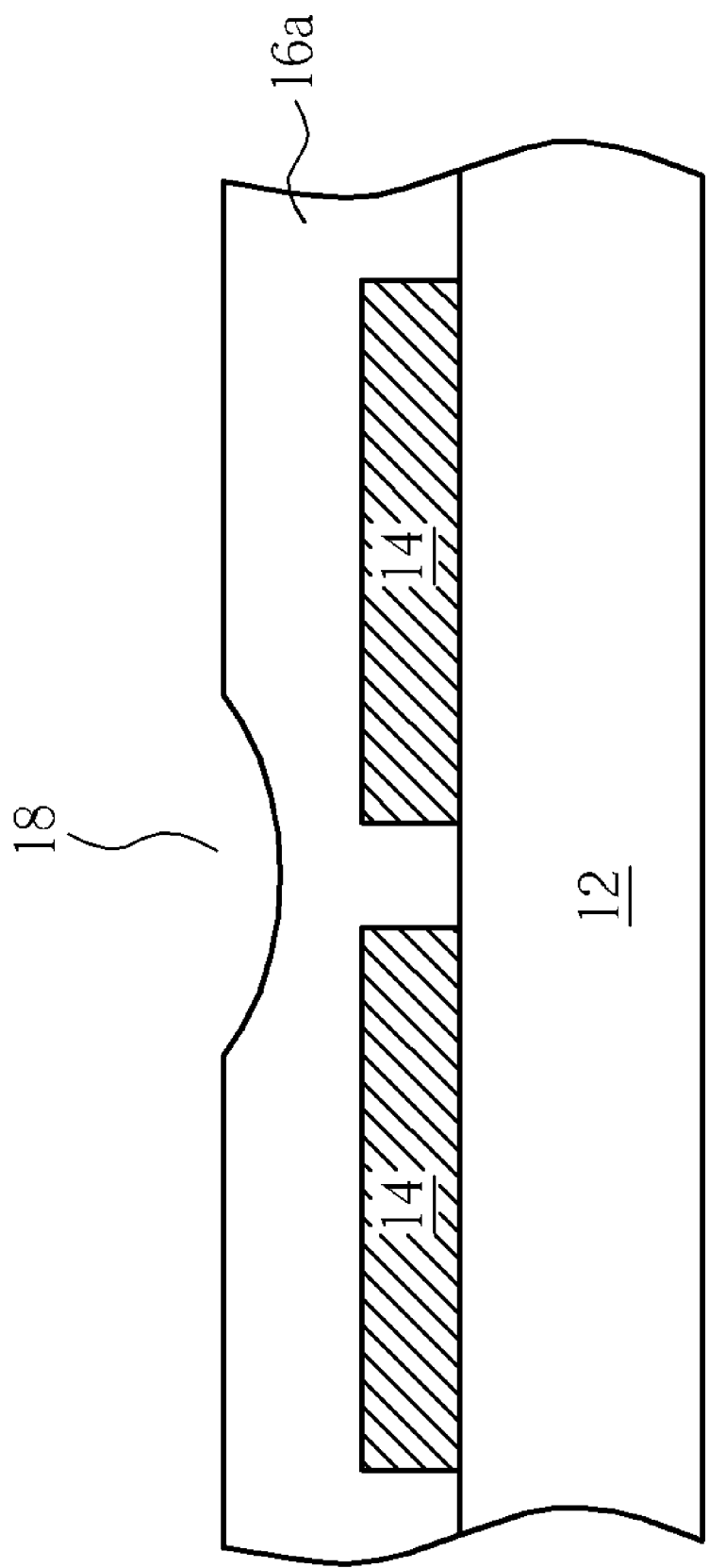
FIG. 2 is a schematically cross-sectional diagram showing a structure after a dielectric layer is filled between the mirror layer units in a conventional method of manufacturing LCoS display panels.
Figure 3:
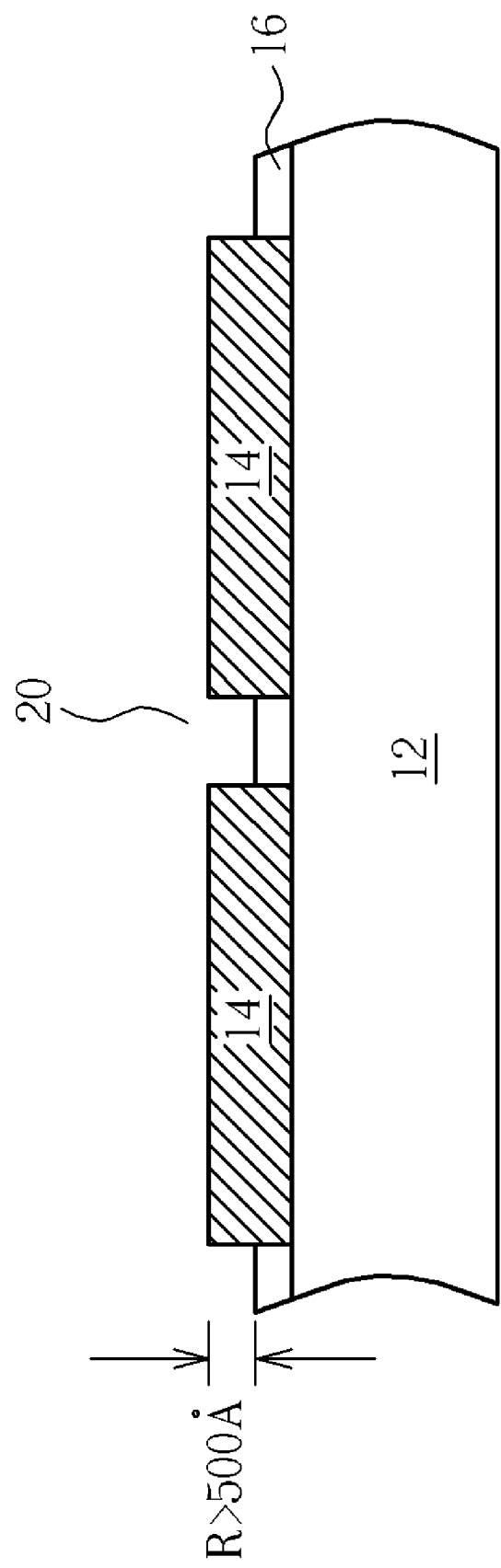
FIG. 3 is a schematically cross-sectional diagram showing a structure after the dielectric layer is removed from the mirror layer units in a conventional method of manufacturing LCoS display panels.
Figure 4:
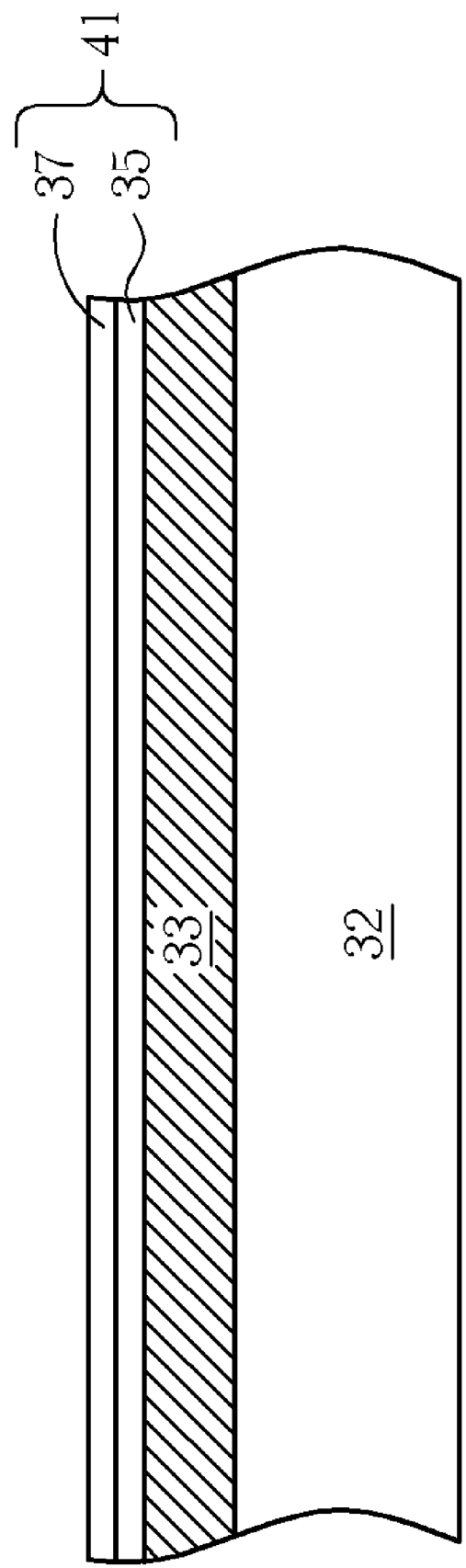
FIGS. 4-8 are schematically cross-sectional diagrams showing the method of improving the flatness of a microdisplay surface and the method of manufacturing LCoS display panels according to the present invention.

Please refer to FIGS. 4-8 which are schematically cross-sectional diagrams showing the method of improving the flatness of a microdisplay surface according to the present invention. As shown in FIG. 4, first a semiconductor substrate 32 is provided. For example, a silicon substrate may be used as the semiconductor substrate. The semiconductor substrate comprises a controlling circuit (not shown). The controlling circuit comprises metal interconnects and a plurality of transistors, such as CMOS transistors, arranged in an array for driving pixel electrodes. The controlling circuit connects the pixel electrodes on the surface of the semiconductor substrate through via plugs.

Next, a reflective mirror layer 33 is formed on the semiconductor substrate 32. A raised layer 41 is formed on the mirror layer 33. The raised layer may have a structure of a single layer formed of one material or a composite layer including a single layer formed of a plurality of materials or a multilayer formed of a plurality of materials. Due to the existence of the raised layer, the dielectric layer remained after subsequent partial removal of the dielectric layer has an increased height, such that a recess will not occur. Accordingly, the thickness of the raised layer is not particularly limited as long as the purpose to raise the thickness of the dielectric layer can be achieved. For the convenience to process, the thickness of the dielectric layer may be for example 100 to 1000 Å. Particularly, a buffer layer 35 may be formed on the mirror layer 33 and the stop layer 37 may be formed on the buffer layer 35 to be as a raised layer. The stop layer functions as an indication for stop during the subsequent removal of the dielectric layer. A material functioning the stop indication for the removal may be selected as the stop layer. For example, for a CMP process on the dielectric layer, titanium nitride can be used as a stop layer, which may be formed by reactive sputtering or chemical vapor deposition. The buffer layer offers a buffer function between the stop layer and the mirror layer during the subsequent process of removing the stop layer, for preventing the smooth surface of the mirror layer from being damaged. The titanium nitride layer has a good etching selectivity over the silicon oxide layer. When the stop layer comprises a titanium nitride layer, the buffer layer may comprise silicon oxide, which may be formed by a vapor deposition process. Other material capable of serving the same function may be used.

A main function of the mirror layer is to provide reflectivity for incident light and to be a pixel electrode electrically connected with the controlling circuit through the corresponding metal plug. The material having electric conductivity and capable of forming a smooth surface for reflection of light may be used, for example, metal, such as aluminum. The metal layer may be formed by for example sputtering, etc.

Figure 5:
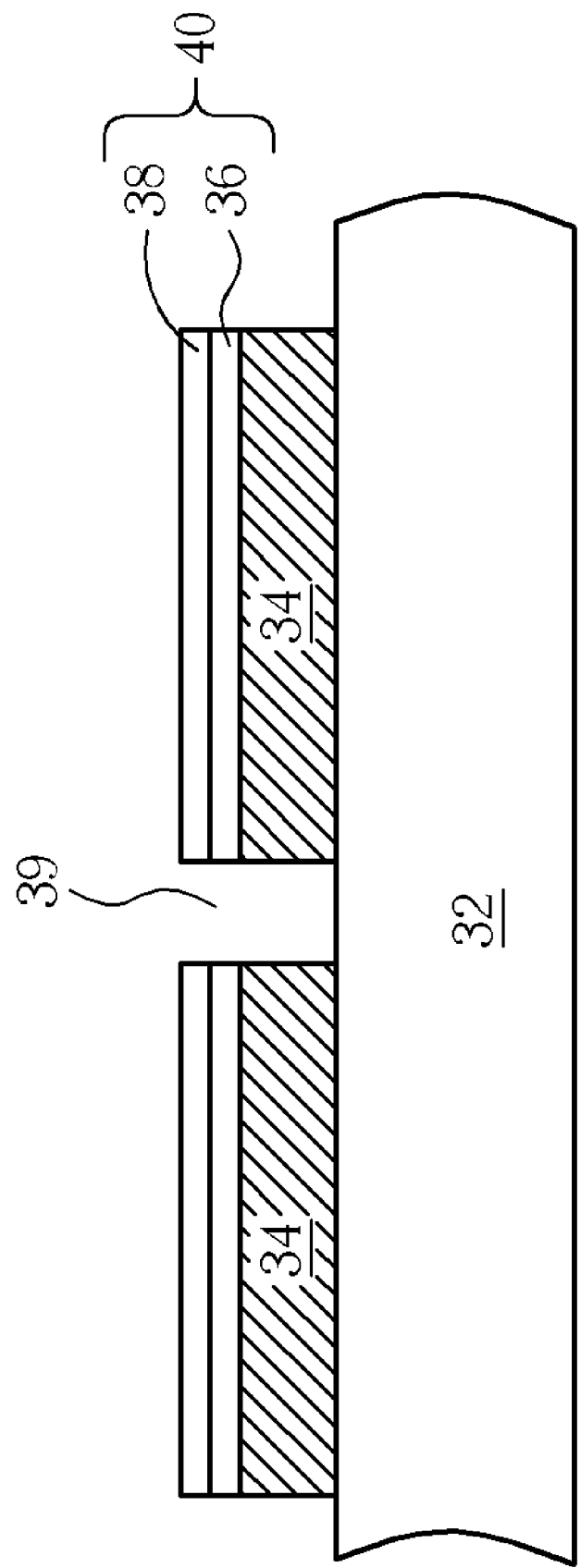
Figure 6:
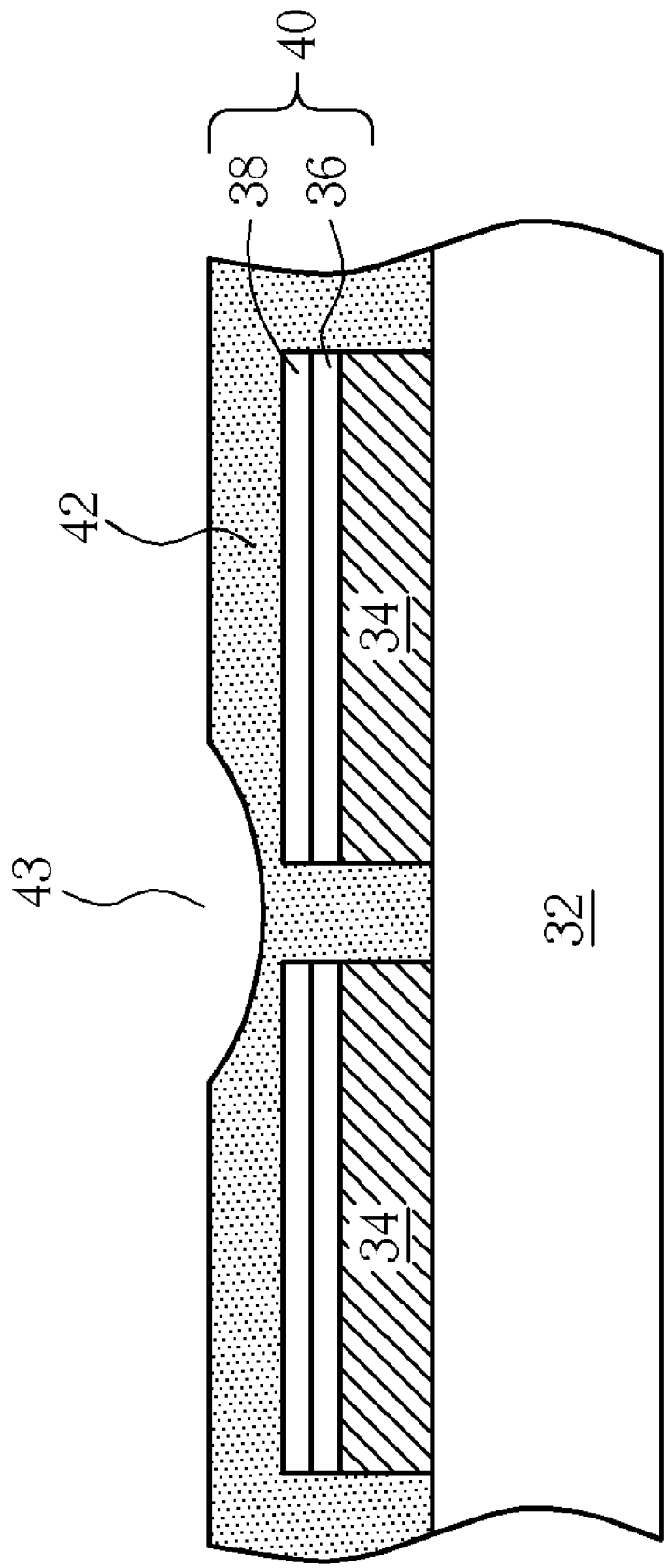

Next, please refer to FIG. 5. A plurality of pixel units are defined from the stop layer 37, the buffer layer 35, and the mirror layer 33, and gaps 39 between each two pixel units are consequently formed. At this time, the pixel unit comprises the mirror layer unit 34, the buffer layer unit 36, and the stop layer unit 38. The buffer layer unit 36 and the stop layer unit 38 may be deemed as the raised layer unit 40. The definition of the pixel units may be accomplished by for example microlithography and the etching process. Thereafter, as shown in FIG. 6, a dielectric layer 42 is formed on the semiconductor substrate 32 to cover the mirror layer unit 34, the buffer layer unit 36, and the stop layer unit 38, and to completely fill the gaps 39. The dielectric layer may be formed by for example chemical vapor deposition. The dielectric layer such formed may have recesses 43 on the surface at the location corresponding to the gaps 39.

Figure 7:
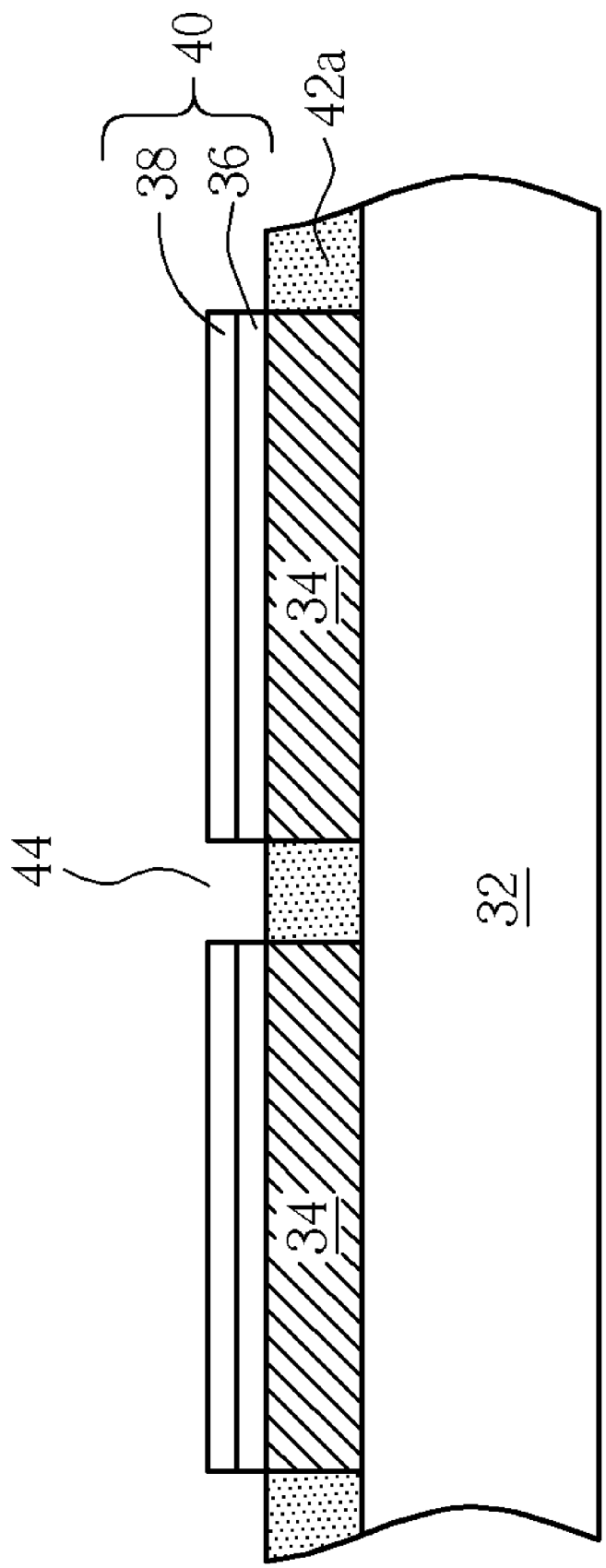
Figure 8:
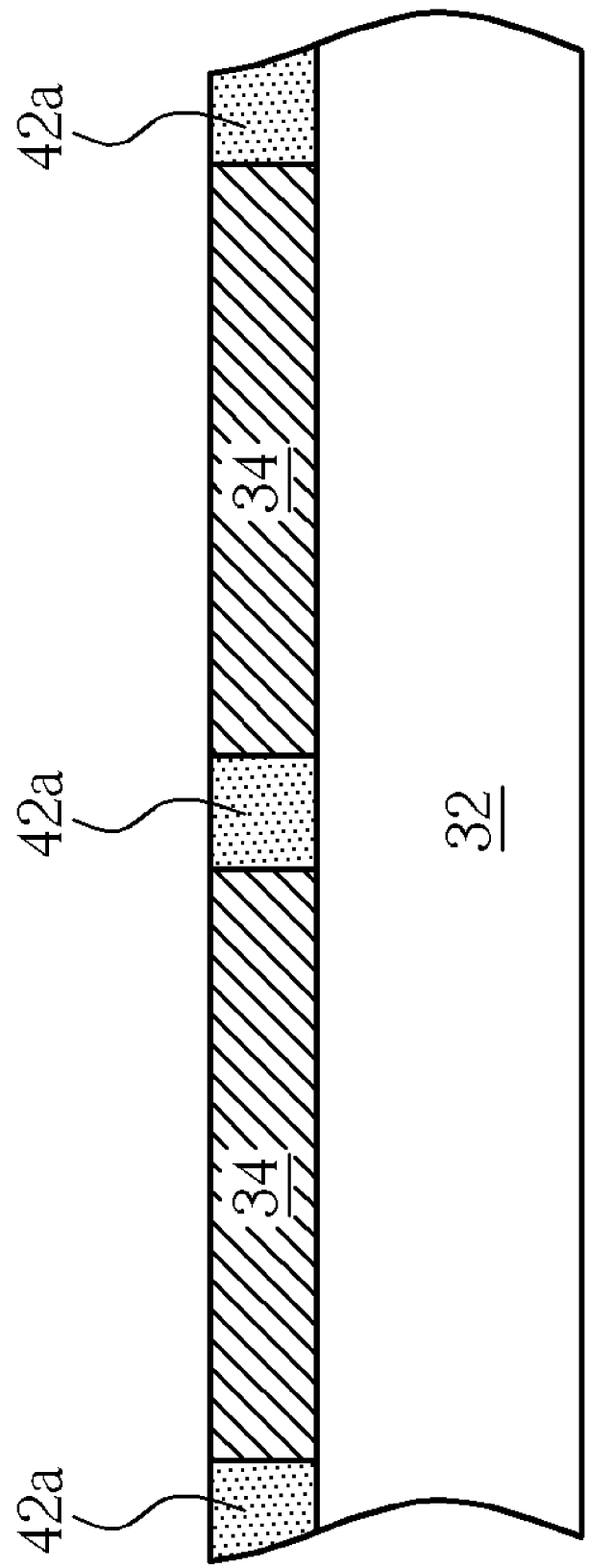

Then, referring to FIG. 7, the dielectric layer 42 is partially removed thereby the portion of the dielectric layer on the surface of the stop layer unit 38 is completely removed and the portion of the dielectric layer filling the gaps 39 is partially removed, such that the height of the dielectric layer 42a in the gaps 39 is not lower than the top of the mirror layer unit 34. The partial removal may be accomplished by for example CMP, dry etching, wet etching, or a combination thereof. For example, a CMP is performed to fast remove the dielectric layer on the stop layer unit 38, or a back etching process is performed, to remove the residue of the dielectric layer on the stop layer unit 38. Thus, although recesses 44 may be formed at the location of the gaps 39, the recesses 44 may be eliminated after the stop layer unit 38 or both of the stop layer unit 38 and the buffer layer unit 36 are removed subsequently, as shown in FIG. 8. Therefore, in the partial removal of the dielectric layer 42, the dielectric layer 42a remained in the gaps 39 must have a height not lower than the top of the mirror layer unit 34, such that, recesses will not occur at the location of the gaps between two pixel electrodes after the stop layer and the buffer layer are removed. The removal of the stop layer unit 38 may be accomplished by, for example, a wet etching process.

Figure 9:
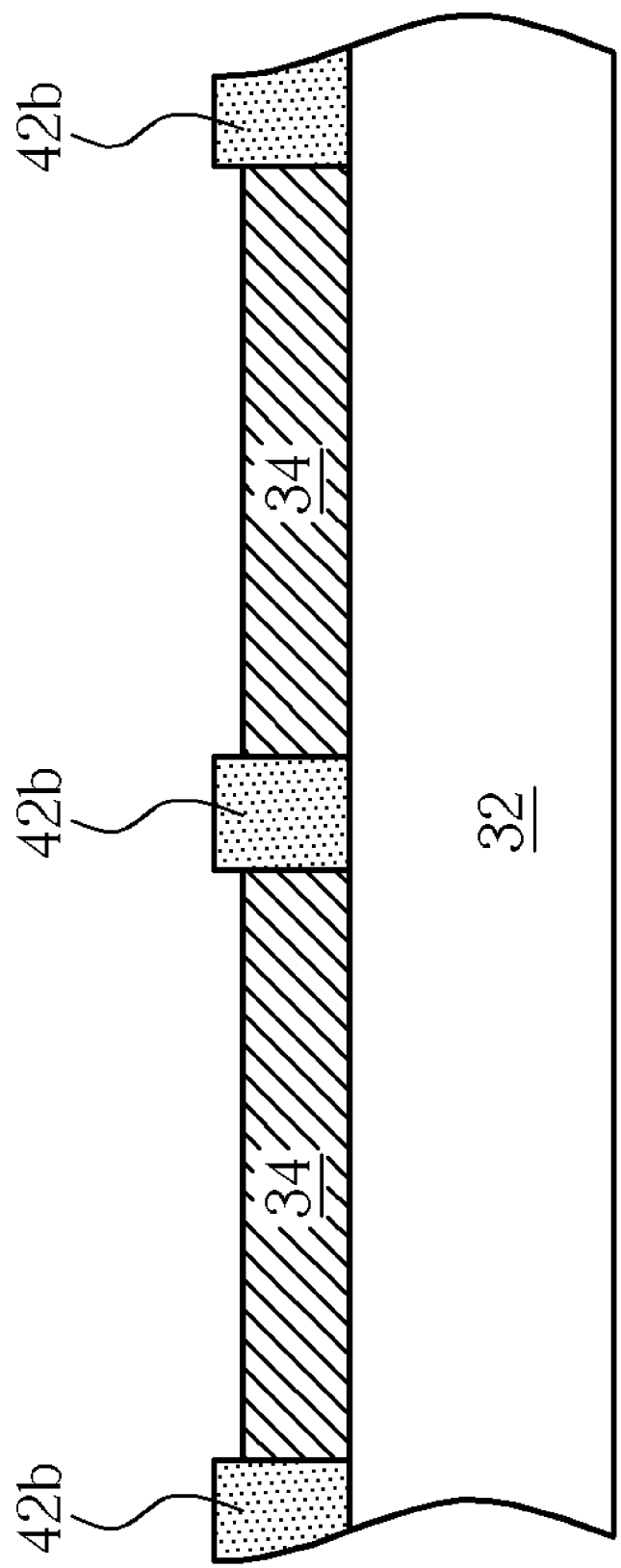
FIG. 9 is a schematically cross-sectional diagram showing another embodiment according to the method of the present invention.

There are two situations for the partial removal of the dielectric layer. One is that the height of the dielectric layer 42a is about the top of the mirror layer, and after the stop layer and the buffer layer are removed, the top of the dielectric layer 42a is as high as the top of the mirror layer to form a planar surface. Thus, the arrangement of the liquid crystal molecules is not affected. Another is that, as shown in FIG. 9, the height of the dielectric layer 42b is higher than the top of the mirror layer unit 34, and after the stop layer and the buffer layer are removed, the top of the dielectric layer 42b is higher than the top of the mirror layer to slightly bulge. Such bulge is acceptable in the subsequent processes and will not affect the arrangement of the liquid crystal.

Figure 10:
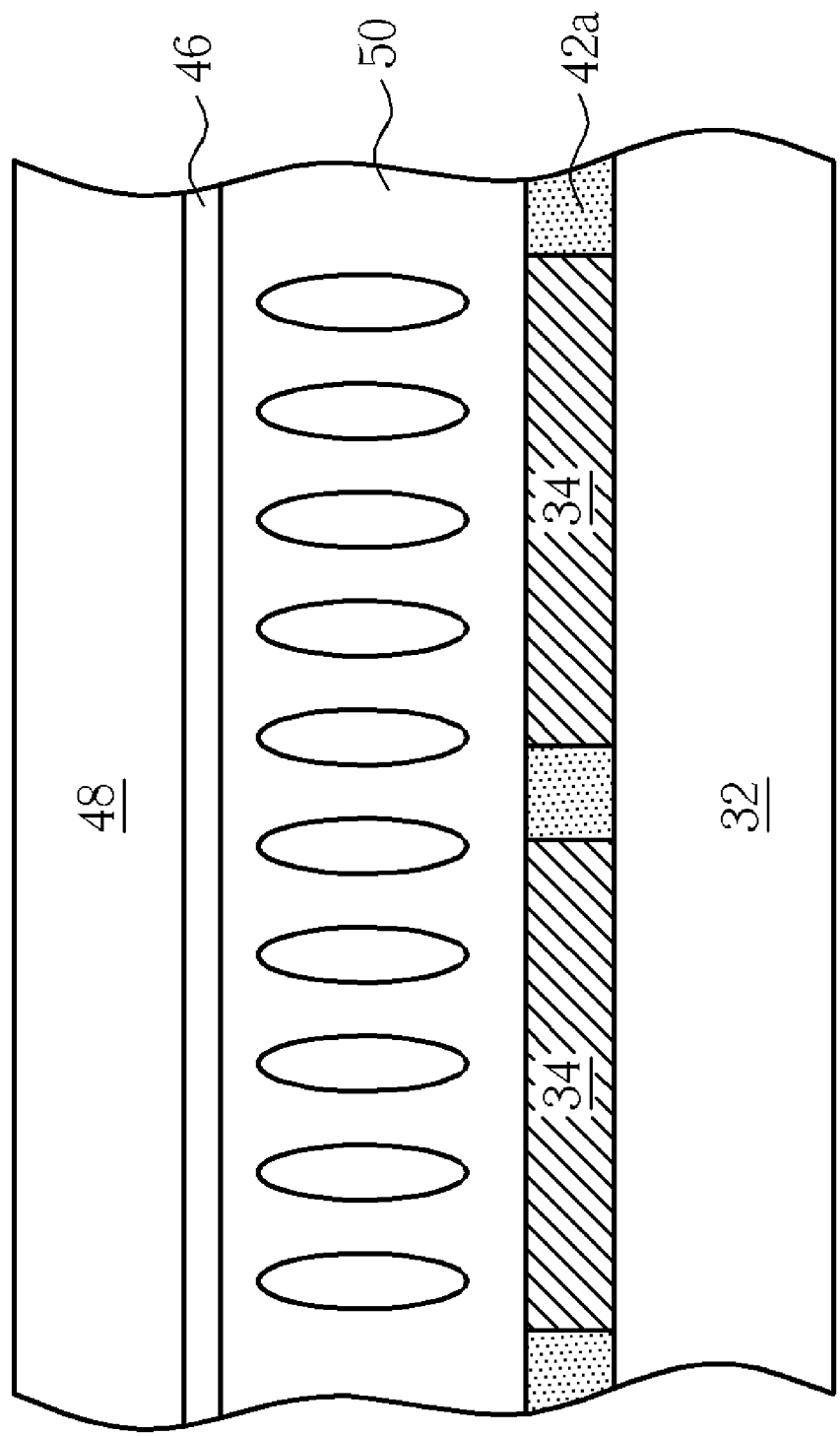
FIG. 10 is a schematically cross-sectional diagram showing an embodiment of the LCoS display panel according to the present invention.

Finally, referring to FIG. 10, a transparent conductive layer is combined onto the semiconductor substrate 32. For example, a transparent conductive layer 46 comprising indium tin oxide (ITO) and a transparent substrate 48 are together combined onto the semiconductor substrate 32, and a cell gap is formed between the transparent conductive layer 46 and the semiconductor substrate 32. Subsequently, a liquid crystal filling process is performed to fill the liquid crystal in the cell gaps to for a liquid crystal layer 50, achieving an LCoS display panel.

Figure 11:
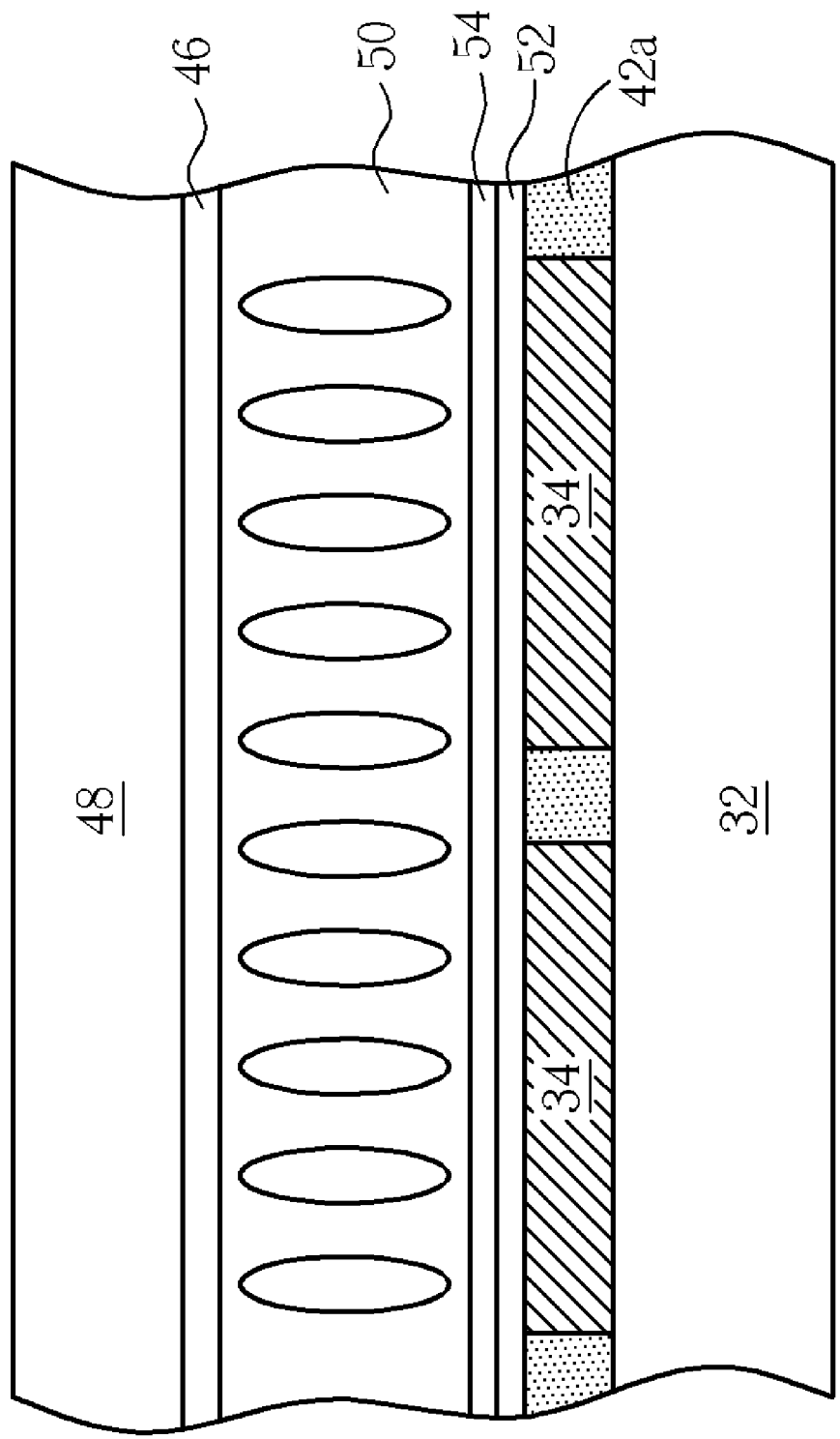
FIG. 11 is a schematically cross-sectional diagram showing another embodiment of the LCoS display panel according to the present invention.

Furthermore, please refer to FIG. 11. In the method of manufacturing LCoS display panels according to the present invention, a passivation layer 52 may be further formed after the partial removal of the dielectric layer and removal of the stop layer and the buffer layer. Since the mirror layer generally comprises metal, such as aluminum, it can be protected from contacting the process environment or the liquid crystal material once being covered by a passivation layer. The passivation layer may comprise inert material layer, for example, oxide layer, oxide-nitride layer (ON layer), oxide-nitride-oxide-nitride layer (ONON layer), or more ON layers. When the passivation layer comprises a proper multi-ON layer, the total reflection of the mirror layer also can be improved.

In the method of improving the flatness of a microdisplay surface and the method of manufacturing LCoS display panels according to the present invention, after partial removal of the dielectric layer, both the stop layer and the buffer layer, or only the stop layer may be removed. In case that only the stop layer is removed, the buffer layer remained may be damaged during the removal of the stop layer. While, when a passivation layer is further to be formed, this buffer layer may be act as a part of the passivation layer. For example, when the buffer layer is a silicon oxide layer, in the subsequent ONON passivation layer forming process, the buffer layer may serve as a part of the oxide layer to form the oxide layer of the ONON layer, that is, the oxide layer of ONON layer is combined with the buffer layer.

Furthermore, still referring to FIG. 11, an alignment film 54 may be further formed on the passivation layer 52 to align the arrangement of the liquid crystal molecules.

All combinations and sub-combinations of the above-described features also belong to the present invention. Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal on silicon (LCoS) display panel, comprising:
   a semiconductor substrate;
   a plurality of reflective mirror layer units on the semiconductor substrate to serve as pixel electrodes and for light reflection, wherein a dielectric layer is filled between each two adjacent reflective mirror layer units higher than the top of the mirror layer units;
   a transparent conductive layer combined onto the semiconductor substrate with the mirror layer units therebetween; and
   a liquid crystal layer disposed between the semiconductor substrate and the transparent conductive layer.

2. The display panel of claim 1, wherein the mirror layer comprises metal.

3. The display panel of claim 2, wherein the metal comprises aluminum.

4. The display panel of claim 1, further comprising a passivation layer on the mirror layer.

5. The display panel of claim 4, wherein the passivation layer comprises a plurality of layers of silicon oxide-silicon nitride layer.

6. The display panel of claim 4, further comprises an alignment film on the passivation layer.

* * * * *